United States Patent [19]

Meadows et al.

[11] Patent Number: 4,648,628
[45] Date of Patent: Mar. 10, 1987

[54] BRANCHED HOSE CONSTRUCTION, T-CONNECTOR THEREFOR AND METHODS OF MAKING THE SAME

[75] Inventors: Roger D. Meadows; James B. Rush, both of Waynesville; James S. Bryan, Haywood County, all of N.C.

[73] Assignee: Dayco Products, Inc., Dayton, Ohio

[21] Appl. No.: 777,804

[22] Filed: Sep. 19, 1985

[51] Int. Cl.$^4$ .......................................... F16L 35/00
[52] U.S. Cl. ..................................... 285/24; 285/156; 285/155; 285/382; 285/423
[58] Field of Search ............... 285/150, 155, 156, 241, 285/242, 253, 256, 259, 260, 423, 24, 382

[56] References Cited

U.S. PATENT DOCUMENTS

| 186,351 | 1/1877 | Leland | 285/150 |
|---|---|---|---|
| 2,460,622 | 2/1949 | Crawley | 285/155 |
| 2,915,324 | 12/1959 | Jackson | 285/150 |
| 2,933,428 | 4/1960 | Mueller | 285/423 |
| 2,968,440 | 1/1961 | Cone | 285/256 |
| 3,142,881 | 8/1964 | Johnston | 285/253 |
| 3,313,314 | 4/1967 | Burke et al. | 137/247.27 |
| 3,369,828 | 2/1968 | Trickey | 285/423 |
| 3,653,692 | 4/1972 | Henson | 285/242 |
| 4,238,131 | 12/1980 | Cleveland | 285/156 |
| 4,312,551 | 1/1982 | Mascolo | 285/156 |
| 4,453,746 | 6/1984 | Keenan | 285/253 |

FOREIGN PATENT DOCUMENTS

| 212881 | 4/1957 | Australia | 285/253 |
|---|---|---|---|
| 566023 | 2/1924 | France | 285/253 |

Primary Examiner—Cornelius J. Husar
Assistant Examiner—Anthony Knight
Attorney, Agent, or Firm—Joseph V. Tassone

[57] ABSTRACT

A branched hose construction, a T-connector therefor and methods of making the same are provided, the branched hose construction comprising T-connector having a body portion provided with a pair of substantially oppositely directed legs extending therefrom and an outwardly directed branch leg extending therefrom intermediate said pair of legs, and three tubular hoses respectively telescoped onto the legs to be disposed in fluid communication with each other through the T-connector, the body portion of the T-connector having an annular shoulder adjacent each leg thereof against which an annular end surface of its respective hose abuts and which is of a size that causes the external peripheral surface of that respective hose to substantially mate with and thereby be substantially flush with the external peripheral surface of the body portion that is adjacent that respective hose.

8 Claims, 21 Drawing Figures

BRANCHED HOSE CONSTRUCTION, T-CONNECTOR THEREFOR AND METHODS OF MAKING THE SAME

BACKGROUND OF THE INVENTION

1. Field of the Invention

This invention relates to an improved branched hose construction and to a T-connector for forming such a branched hose construction as well as to improved methods of making the construction and the T-connector thereof.

2. Prior Art Statement

It is know to provide a branched hose construction comprising a T-connector having a body portion provided with a pair of substantially oppositely directed legs extending therefrom and an outwardly directed branch leg extending therefrom intermediate the pair of legs, and three tubular hoses respectively telescoped onto the legs to be disposed in fluid communication with each other through the T-connector, each hose having an outer peripheral surface and an annular end surface and the body portion of the T-connector having an external peripheral surface adjacent the legs thereof. For example, see the Burke et al, U.S. Pat. No. 3,313,314.

Such a branched hose construction is also known to have the body portion provided with an annular shoulder adjacent each leg thereof against which the annular end surface of its respective hose abuts and which is of a size that causes the external peripheral surface of that respective hose to substantially mate with and thereby be substantially flush with the external peripheral surface of the body portion that is adjacent that respective hose. In addition, such known branched hose construction has annular clamping means respectively disposed about the hoses and clamping the same against their respective legs of the T-connector. For example, see the Australian patent to Lindberg, No. 212,881.

SUMMARY OF THE INVENTION

It is one feature of this invention to provide an improved branched hose construction wherein the body portion of the T-connector thereof provides a smooth flush mating arrangement with the hoses that are telescoped thereon.

In particular, it was found according to the teachings of this invention that by forming annular shoulders adjacent each leg of the T-connector so as to abut annular end surfaces of their respective hoses and be of a size that causes the external peripheral surfaces of the respective hoses to substantially mate with and thereby be substantially flush with the external peripheral surfaces of the body portion of the T-connector that are respectively adjacent the hoses, the resulting branched hose construction is not only attractive in the design thereof, but is also effective for maintaining the three hoses secured onto the repsective legs of the T-connector in varoius unique manners as hereinafter set forth.

For example, one embodiment of this invention provides a branched hose construction comprising a T-connector having a body portion provided with a pair of substantially oppositely directed legs extending thereform and an outwardly directed branch leg extending therefrom intermediate the pair of legs, and three tubular hoses respectively telescoped onto the legs to be disposed in fluid communicaton with each other through the T-connector, each hose having an outer peripheral surface and an annular end surface and the body portion having an external peripheral surface adjacent the legs thereof. The body portion of the T-connector has an annular shoulder adjacent each leg thereof against which the annular end surface of its respective hose abuts and which is of a size that causes the external peripheral surface of that respective hose to substantially mate with and thereby be substantially flush with the external peripheral surface of the body portion that is adjacent that respective hose. Annular claming means are respectively disposed about the hoses and clamp the same against their respective legs of the T-connector. Each annular shoulder of the T-connector has an outwardly extending projection means thereon and each hose has the annular end surface thereof deformed around the projection means of its respective annular shoulder by its respective clamping means so as to substantially embed the projection means therein.

Accordingly, it is an object of this invention to provide an improved branched hose construction having one or more of the novel features of this invention as set forth above or hereinafter shown or described.

Another object of this invention is to provide an improved method of making such a branched hose construction, the method of this invention having one or more of the novel features of this invention as set forth above or hereinafter shown or described.

Another object of this invention is to provide an improved T-connector for a branched hose construction, the T-connector of this invention having one or more of the novel features of this invention as set forth above or hereinafter shown or described.

Another object of this invention is to provide an improved method of making such a T-connector, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter illustrated and described as being particularly adapted to provide a branched hose construction for automotive use, it is to be understood that the various features of this invention can be utilized singly or in various combinations thereof to provide a branched hose construction for other uses as desired.

Therefore, this invention is not to be limited to only the embodiments illustrated in the drawings, because the drawings are merely utilized to illustrate some of the wide variety of uses of this invention.

Referring now to FIGS. 1–4, one embodiment of the improved branched hose construction of this invention is generally indicated by the reference numeral 30 and comprises a T-connector of this invention that is generally indicated by the reference numeral 31 and three tubular members or hoses 32, 33 and 34 interconnected together by the T-connector 31 in a manner hereinafter set forth so that the tubular hoses 32–34 are fluidly interconnected together through the T-connector 31 as will be apparent hereinafter.

The T-connector 31 of this invention comprises a hollow body portion 35 having a pair of substantially oppositely directed tubular legs or nipples 36 and 37 extending therefrom and an outwardly directed tubular branch leg or nipple 38 extending therefrom intermediate the pair of legs 36 and 37, the legs 36–38 being in fluid communication with each other through the hollow body portion 35 of the T-connector 31.

While the T-connector 31 of this invention has the legs 36 and 37 being substantially identical to each other while the leg 38 is smaller in diameter than the legs 36 and 37, it is to be understood that the legs of the T-connector 31 of this invention can all be of the same size and configuration and/or could all be dissimilar as desired.

Figures 1, 2, 3, 5:
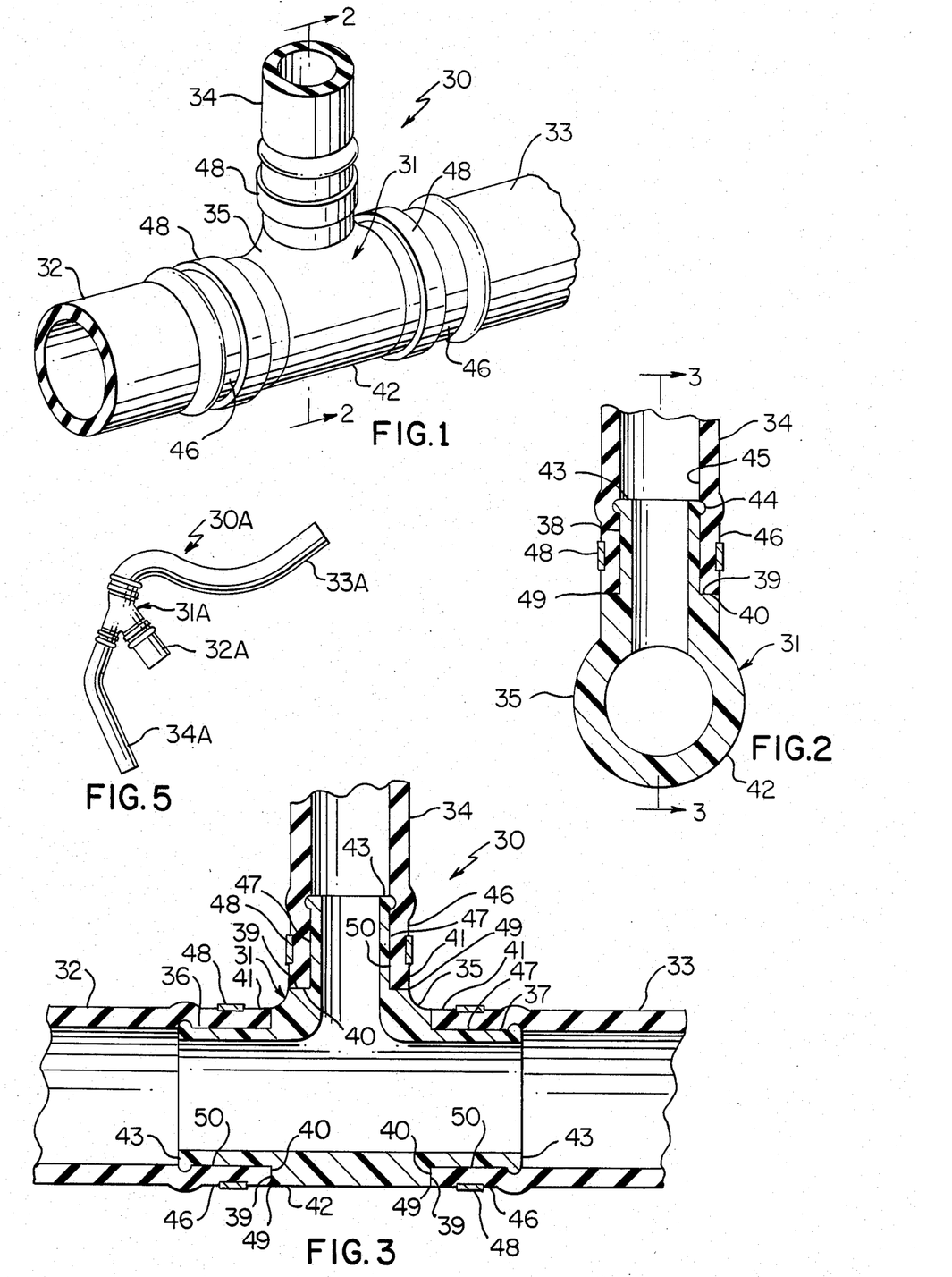
FIG. 1 is a fragmentary perspective view of one embodiment of the improved branched hose construction of this invention.
FIG. 2 is an enlarged, fragmentary cross-sectional view taken on line 2—2 of FIG. 1.
FIG. 3 is a fragmentary cross-sectional view taken on line 3—3 of FIG. 2.
FIG. 5 is a reduced side view of another embodiment of the improved branched hose construction of this invention.
Figure 4:
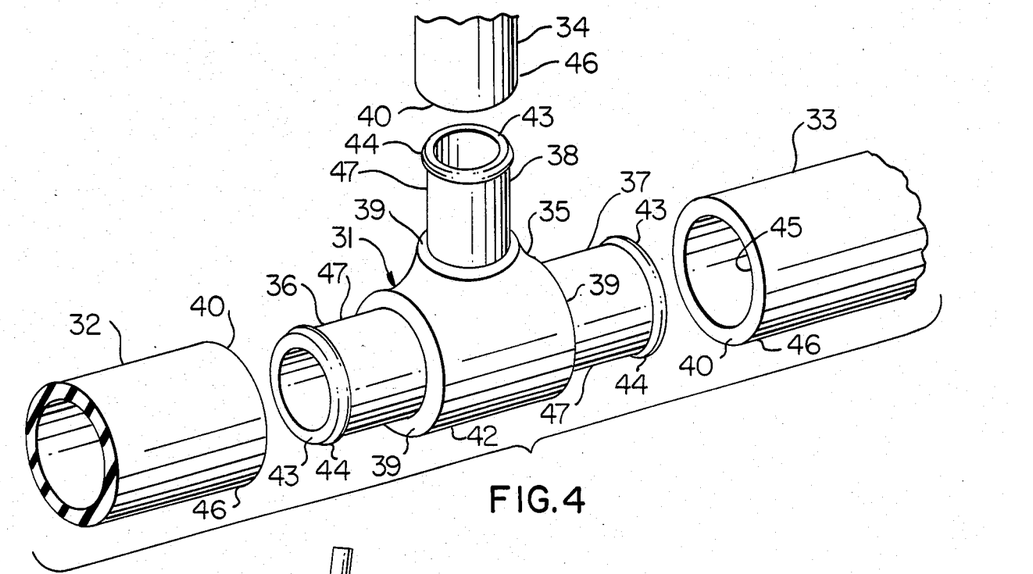
FIG. 4 is a fragmentary, exploded perspective view of the branched hose construction of FIG. 1.

The body portion 35 of the T-connector 31 has an annular shoulder 39 adjacent each leg 36–38 thereof and against which annular end surfaces 40 of the respective hoses 32–34 abut and which are of a size that causes the external peripheral surfaces 41 of the respective hoses 32–34 to substantially mate with and thereby be substantially flush with the external peripheral surfaces 42 of the body portion 31 that are respectively disposed adjacent the hoses 32–34, the annular shoulders 39 each being disposed substantially at a right angle relative to its respective leg 36, 37 or 38 and the annular end surface 40 each being disposed substantially at a right angle relative to the longitudinal axis of the respective hose 32, 33 or 34.

In this manner, it can be seen that the resulting branched hose construction 30 of this invention as illustrated in FIG. 1 is relatively attractive in design and as illustrated in FIGS. 2 and 3, a substantially flush and smooth connection is provided between the hoses 32–34 and the T-connector 31 at the external surfaces 41 and 42 thereof so as to tend to prevent foreign matter from separating and entering between the adjacent end surfaces 40 and the annular shoulders 39 as illustrated in the drawings, the end surfaces 40 and the annular shoulders 39 engaging each other throughout substantially the entire radial dimensions thereof.

If desired, the free ends 43 of the legs 36–38 of the T-connector 31 of this invention can be provided with outwardly directed annular bead-like projection means or lips 44 for digging into the internal peripheral surfaces 45 of the respective hoses 32–34 as illustrated in FIGS. 2 and 3 in order to more fully hold the telescoped end portions 46 of the respective hoses 32–34 thereon whereby the hoses 32–34 are press-fit onto the legs 36–38 of the T-connector 31.

In addition, suitable annular clamping means can be utilized to clamp or fasten the respective telescoped portions 46 of the hoses 32–34 firmly against the external peripheral surfaces 47 of the respective legs 36–38 of the T-connector 31.

For example, such annular clamping means are indicated by the reference numeral 48 of FIGS. 1-3 and can comprise conventional annular flat bands 48 formed of metallic material and secured in place in a conventional manner, the bands 48 of the hose construction 30 of this invention being disposed in outwardly spaced manner from the juncture areas 49 that are defined between the respective end surfaces 40 of the hoses 32–34 and the cooperating annular shoulders 39 of the T-connector 31.

While the T-connector 31 of this invention can be formed of any suitable material, such as polymeric material, metallic material, etc., or even combinations of materials as desired, the same can comprise a one-piece member that is molded into the configuration illustrated in the drawings from polymeric material, such as polysulfone.

Also, while the hoses or tubular members 32–34 could be formed of any suitable material, the same can comprise polymeric material and are illustrated as being rubber material in the drawings.

Also, the annular fastening bands 48 could be formed of any suitable material such as metallic material, polymeric material, or even combinations thereof and have been made from galvanized steel or aluminum.

Of course, the particular materials for the various parts of the branched hose construction of this invention should be selected so as to be compatible with the particular fluid system utilizing the same.

In any event, it can be seen that it is a relatively simple method of this invention to make the branched hose construction 30 of this invention by merely providing the tubular connector 31 of this invention and readily telescoping the end portions 46 of the hoses or tubular members 32–34 onto the legs 36–38 until the end surfaces 40 thereof abut against the annular shoulders 39 of the T-connector 31, the end portions 46 of the hoses 32–34 being forced in press-fit manner over the lips or beads 44 on the legs 36–38 so that the lips or beads 44 firmly hold the hoses 32–34 in their telescoped relations onto the surfaces 47 of the legs 36–38 as illustrated in the drawings.

If desired, the annular clamps 48 can be thereafter disposed about the telescoped portions 46 of the tubular hoses 36–38 to firmly clamp the internal peripheral surfaces 50 of the telescoped portions 46 of the hoses 32–38 against the external peripheral surfaces 47 of the respective legs 36–38 of the T-connector 31 to not only firmly fasten the hoses 32–38 thereto, but also to effect a fluid sealing relation therewith in a manner well known in the art.

While the T-connector 31 of this invention has been previously described and illustrated as having the opposed legs 36 and 37 thereof being substantially coaxial with the branch leg 38 being disposed substantially at a right angle relative thereto, it is to be understood that the three legs of the T-connector of this invention can be disposed at any suitable angle relative to each other whereby the same will still have a pair of legs substantially oppositely directed and an outwardly directed branch leg intermediate those pair of legs.

Figures 6, 7, 8:
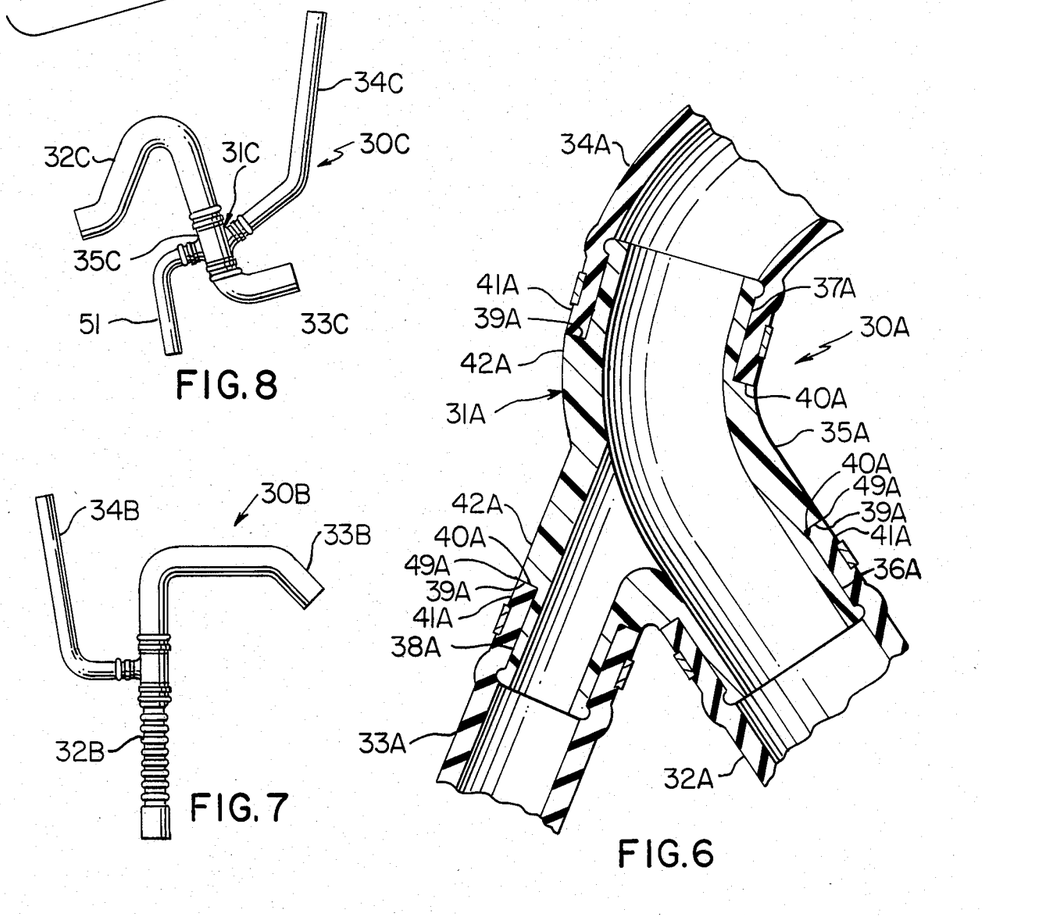
FIG. 6 is an enlarged fragmentary cross-sectional view of the branched hose construction of FIG. 5.
FIG. 7 is a view similar to FIG. 5 and illustrates another embodiment of the improved branched hose construction of this invention.
FIG. 8 is a view similar to FIG. 5 and illustrates another embodiment of the improved branched hose construction of this invention.

For example, another embodiment of the improved branched hose construction of this invention is generally indicated by the reference numeral 30A in FIGS. 5 and 6 and parts thereof similar to the branched hose construction 30 previously described are indicated by like reference numerals followed by the reference letter "A".

As illustrated in FIGS. 5 and 6, it can be seen that the body portion 35A of the T-connector 31A is cured between the legs 36A nd 37A thereof and the branch leg 38A is disposed so as to make substantially an acute angle with the leg 36A and an obtuse angle with the leg 37A.

However, it can be seen that the body portion 35A is still provided with the annular shoulders 39A adjacent the legs 36A–38A thereof and against which the end surfaces 40A of the hoses 32A–34A abut and have the outer peripheral surfaces 41A thereof disposed substantially flush with the external peripheral surfaces 42A of the body portion 35A that are disposed adjacent the shoulders 39A so as to provide the smooth closed joints 49A for the reasons previously set forth.

Thus, it can be seen that the T-connector of this invention can be formed in the desired configuration to provide for a specified branched hose construction that has a unique configuration thereof.

For example, another branched hose construction of this invention is generally indicated by the reference numeral 30B in FIG. 7 and parts thereof similar to the branched hose constructions of this invention previously described are indicated by the like reference numerals followed by the reference letter "B".

As illustrated in FIG. 7, it can be seen that each of the tubular members or hoses 32B–34B have been molded into particular configurations thereof and each is dissimilar to the other hoses of the hose construction 30B just as the hoses 32A–34A of the hose construction 20A of FIG. 5 have been molded into the particular different configurations thereof for a specific fluid system, such as the fluid system of a particular internal combustion engine for a transportation vehicle or the like.

It is also to be understood that while the connector 31 of this invention is called a "T-connector", such T-connector can have additional legs extending therefrom rather than just three and can still be considered as a "T-connector" for three of those legs even though other legs extend therefrom.

For example, reference is now made to FIG. 8 wherein another embodiment of the branched hose construction of this invention is generally indicated by the reference numeral 30C and parts thereof similar to the branched hose constructions previously described are indicated by like reference numerals followed by the reference letter "C".

As illustrated in FIG. 8, the T-connector 31C of the branched hose construction 30C has four tubular members or hoses 32C, 33C, 34C and 51 extending therefrom because the T-connector 31C as four legs (not shown) extending from the body portion 35C thereof in a manner similar to the three legs 32–34 of the T-connector 31.

If desired, the legs of the T-connector of this invention can be provided with groove means therein which will receive clamped parts of the hoses therein so as to further secure the telescoped portions thereof together.

Figures 9, 10, 11:
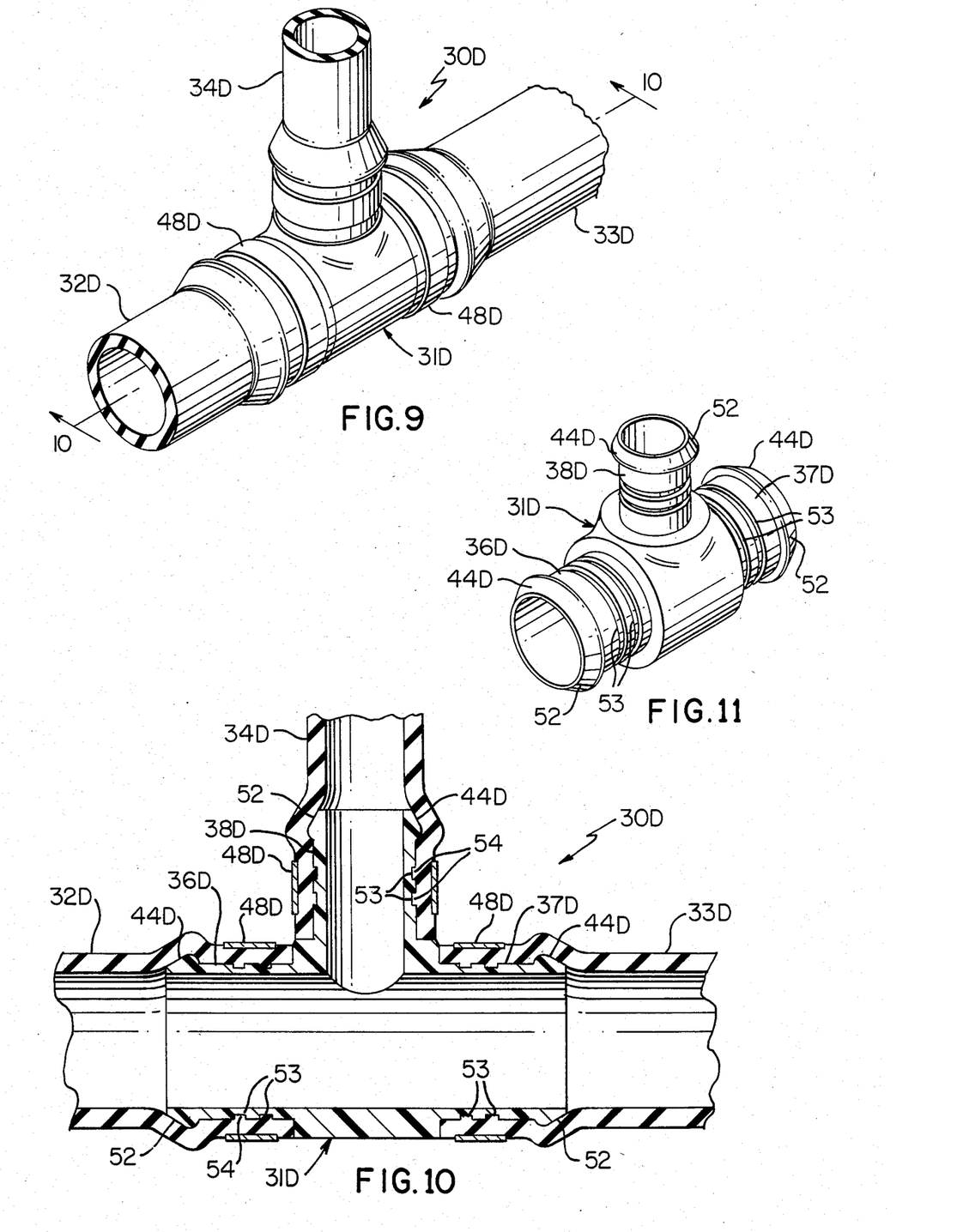
FIG. 9 is a view similar to FIG. 1 and illustrates another embodiment of the improved branched hose construction of this invention.
FIG. 10 is an enlarged, fragmentary cross-sectional view taken on line 10—10 of FIG. 9.
FIG. 11 is a perspective view of the T-connector of this invention that is utilized to form the branched hose construction of FIGS. 9 and 10.

For example, another embodiment of the branched hose construction of this invention is generally indicated by the reference numeral 30D in FIGS. 9 and 10 and parts thereof similar to the branched hose constructions previously described are indicated by like reference numerals followed by the reference letter "D".

As illustrated in FIGS. 9–11, the branched hose construction 30D is substantially the same as the branched hose construction 30 previously described except that the lips or bead means 44D of the legs 36D–38D of the T-connector 31D have camming or sloping portions 52 on the forward ends thereof which facilitates the insertion of the legs 36D–38D into the hoses or tubular members 32D–34D during the assembly of the hose construction 30D in the manner previously described.

In addition, the T-connector 31D of the hose construction 30D of this inventon has one or more annular grooves 53 formed in the external peripheral surface 47D of the legs 36D–38D and in the embodiment illustrated in the drawings, two such grooves 53 are provided in spaced apart relation on each of the legs 36D–38D.

When the fastening bands 48D are disposed around the telescoping portions 46D of the tubular members 32D–34D and are utilized to compress the portions 46D toward the external peripheral surfaces 47D of the legs 36D–38D, parts 54 of the telescoping portions 46D of the hoses 32D–34D are deformed and forced into the grooves 53 in the manner illustrated in FIG. 10 so as to provide further means for tending to prevent the hoses 32D–34D from being pulled off of the respective legs 36D–38D of the T-connector 31D after the clamping members 48D have been disposed in place. Also, such deformed parts 54 of the hoses 32D-34D in cooperation with the grooves 53 provide for increased sealing between the legs 36D-38D of the T-connector 31D and the hoses 32D-34D.

While the clamping means of the hose constructions of this invention have been previously described and illustrated as being spaced from the juncture areas between the ends of the hoses and the annular shoulders of the cooperating T-connectors therefor, it is to be understood that the fastening bands or clamps could overlap such juncture areas and could have the overlapping portions thereof actually extend into the body portion of the T-connector and be received in annular recesses formed therein if desired.

Figures 12, 14:
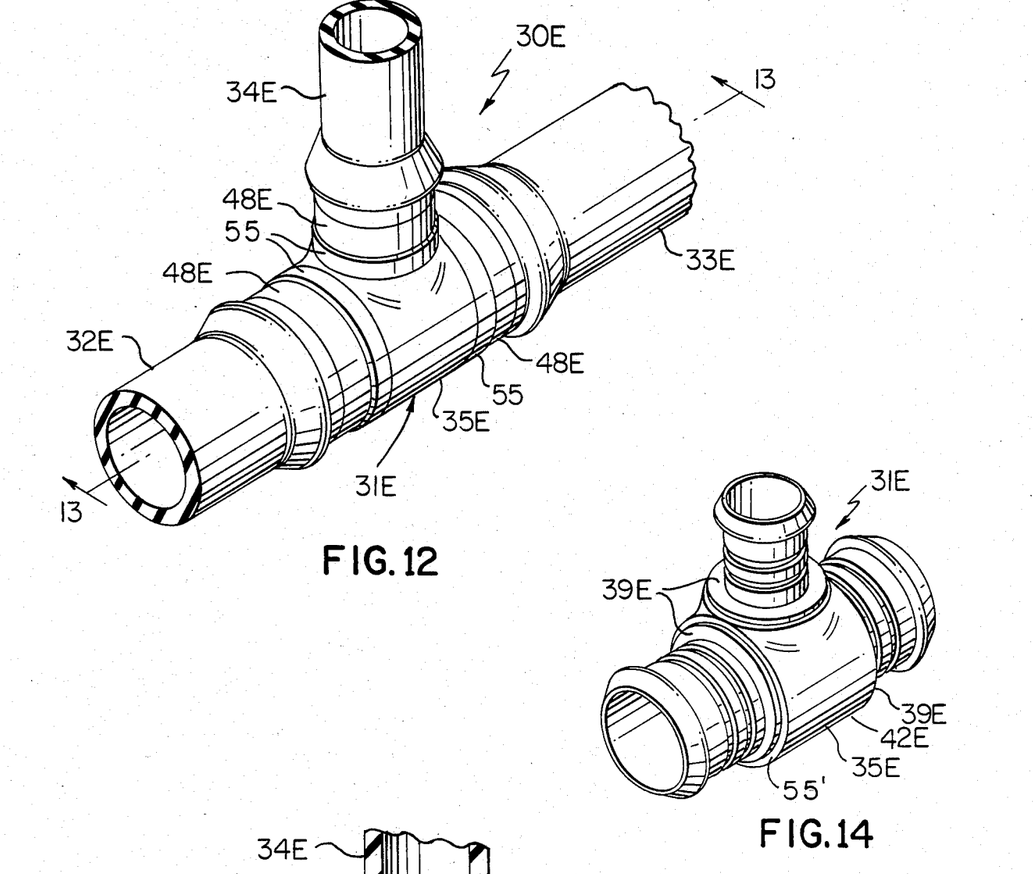
FIG. 12 is a view similar to FIG. 1 and illustrates another embodiment of the improved branched hose construction of this invention.
FIG. 14 is a perspective view of the T-connector of this invention that is utilized to form the branched hose construction of FIGS. 12 and 13.
Figure 13:
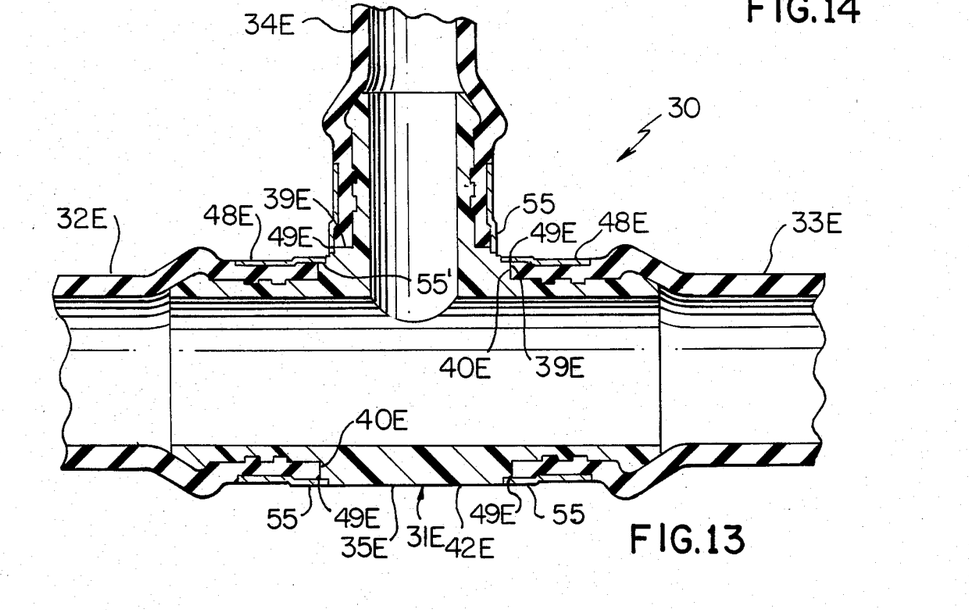
FIG. 13 is an enlarged, framentary cross-sectional view taken on line 13—13 of FIG. 12.

For example, another embodiment of the branched hose construction of this invention is generally indicated by the reference numeral 30E in FIGS. 12 and 13 and parts thereof similar to the hose constructions previously described are indicated by like reference numerals followed by the reference letter "E".

As illustrated in FIGS. 12-14, it can be seen that the hose construction 30E is substantially identical to the hose construction 30D previously described except that the fastening bands 48E thereof have annular portions or parts 55 thereof that extend over the juncture areas 49E that the end surfaces 40E of the hoses 32E-34E mate with the annular shoulders 39E of the T-connector 31E as well as onto the body portion 35E of the T-connector 31E.

If desired, the body portion 35E of the T-connector 31E of the hose construction 30E could be provided with annular recesses 55' adjacent the annular shoulders 39E so as to receive the parts 55 of the holding members or clamps 48E as illustrated whereby the outer peripheral surfaces 56 of the clamps 48E are disposed substantially flush with the adjacent external peripheral surfaces 42E of the body portion 35E as illustrated.

In this manner, the parts 55 of the fastening members 48E protect the juncture areas 49E from receiving dirt and the like therein.

If desired, the T-connectors of this invention can be provided with means that will cooperate with means on the hoses so as to orient the rotational position of the hoses on the legs of the respective T-connector so that the hoses will be in the proper rotational position thereon when assembled therewith so as to provide for a desired configuration of the resulting hose construction for assembly purpose with other structure, such as the remaining fluid system of the automobile using the same.

Figure 15:
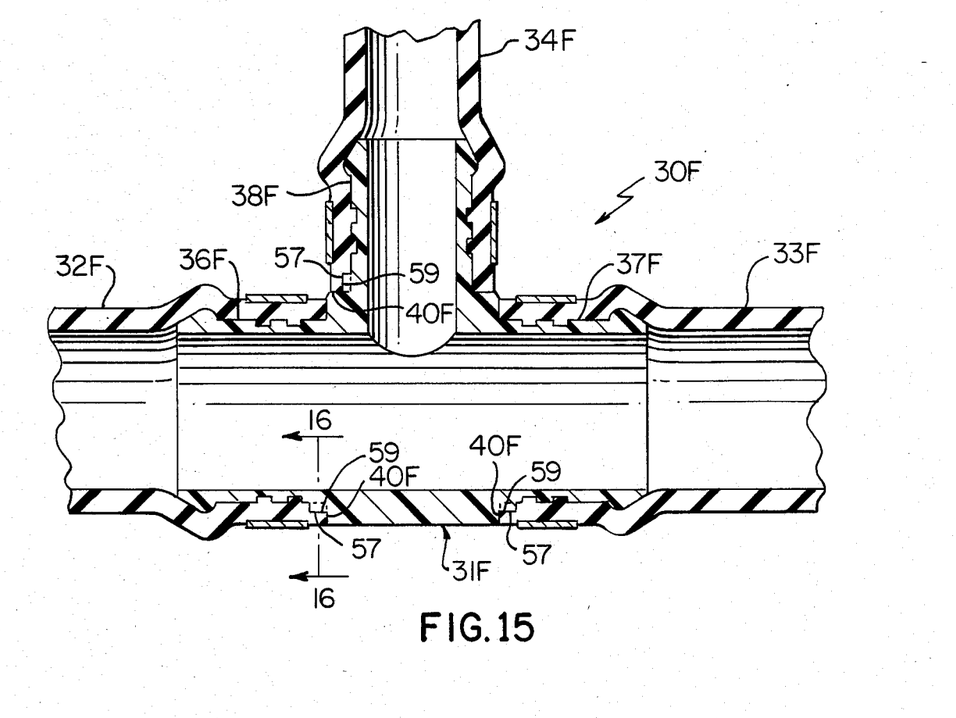
FIG. 15 is a view similar to FIG. 3 and illustrates another embodiment of the improved branched hose construction of this invention.
Figure 16:
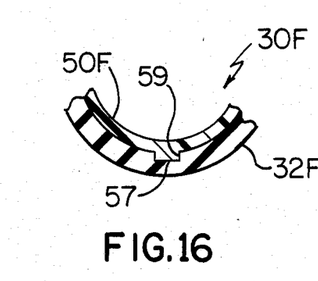
FIG. 16 is a fragmentary cross-sectional view taken on line 16—16 of FIG. 15.

For example, another embodiment of the improved branched hose construction of this invention is generally indicated by the reference numeral 30F in FIGS. 15 and 16 and parts thereof similar to the parts of the branched hose constructions previously set forth are indicated by like reference numerals followed by the reference letter "F".

Figure 17:
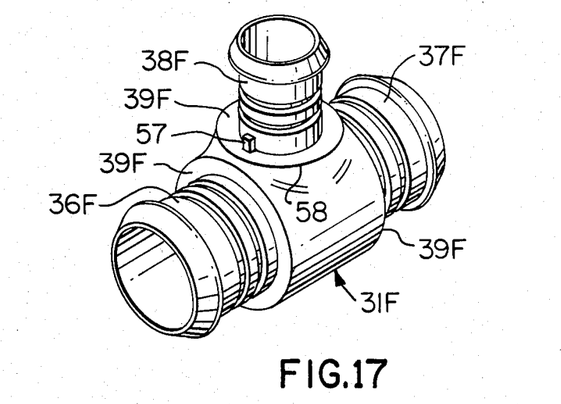
FIG. 17 is a reduced perspective view of the T-connector of this invention that is utilized to form the branched hose construction of FIGS. 15 and 16.

As illustrated in FIGS. 15 and 16, the branched hose construction 30F is substantially the same as the hose construction 30D previously described except that each annular shoulder 39F of the T-connector 31F has an outwardly extending projection 57 that also extends from the respective leg 36F, 37F or 38F in the manner illustrated in FIG. 17 while being disposed inboard of the outer peripheral edge means 58 of the respective shoulder 39F.

Each hose 32F-34F of the branched hose construction 30F has a slot means 59 that interrupts the annular end surface 40F thereof as well as the internal peripheral surface 50F thereof in a desired position so that the slot means 59 will receive a particular projection 57 and thereby cause that particular hose 32F, 33F or 34F to be rotationally oriented relative to the respective leg 36F, 37F or 38F in the manner illustrated in FIGS. 15 and 16.

Also, it may be found that it is desired to provide initial spacing between the end surface of a particular hose and its respective annular shoulder on the T-connector to allow for outward expansion of the hose toward that shoulder during the clamping operation of an annular clamp on the telescoped portion of that hose.

Figures 18, 19, 20, 21:
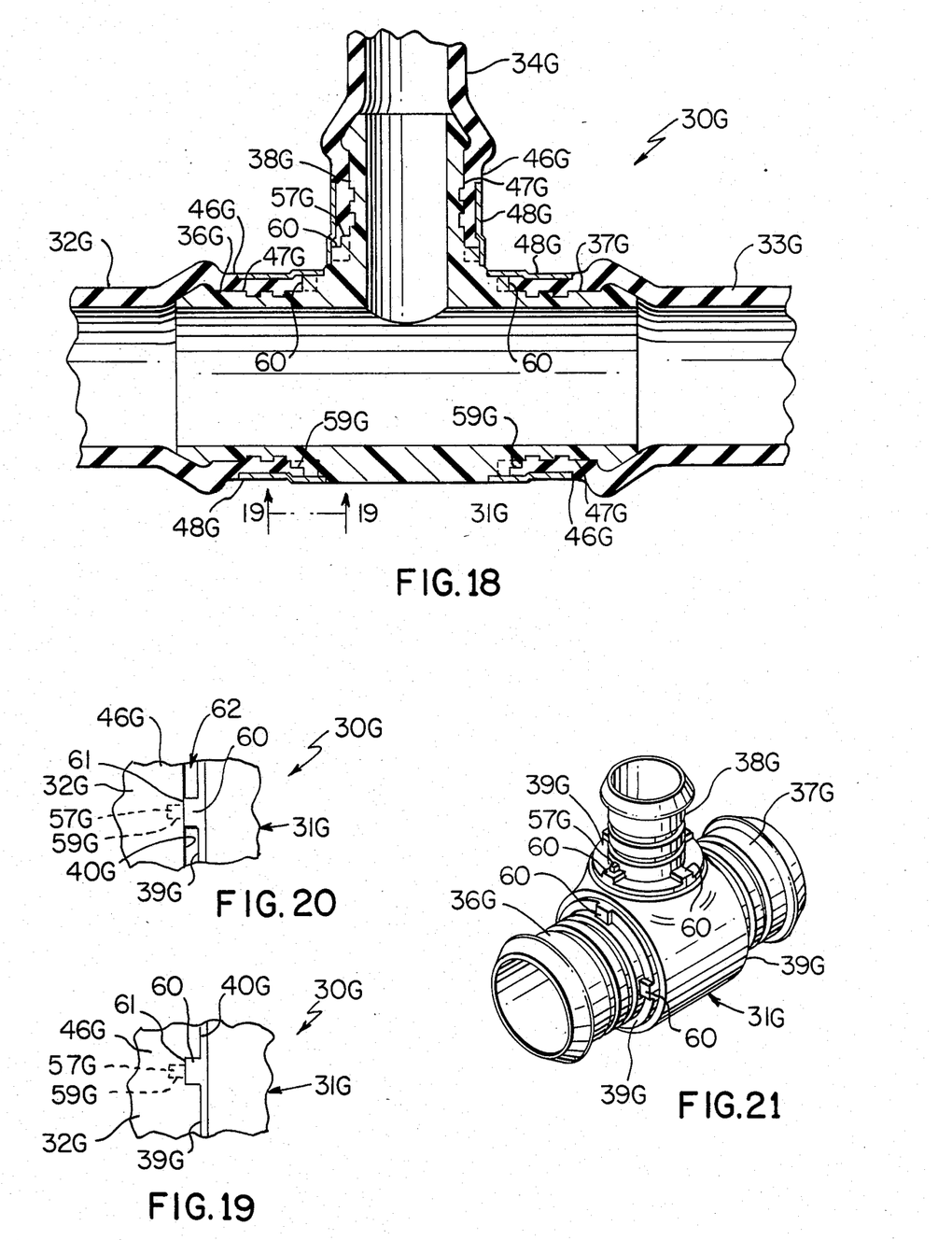
FIG. 18 is a view similar to FIG. 3 and illustrates another embodiment of the improved branched hose construction of this invention.
FIG. 19 is a fragmentary view taken in the direction of the arrows 19—19 of FIG. 18 with the clamping band removed.
FIG. 20 is a view similar to FIG. 19 and illustrates the hose and T-connector of FIG. 19 before the same have been clamped in the telescoped condition thereof.
FIG. 21 is a reduced perspective view of the T-connector of this invention that is utilized to form the branched hose construction of FIGS. 18–20.

For example, another embodiment of the improved branched hose construction of this invention is generally indicated by the reference numeral 30G in FIGS. 18 and 19 and parts thereof similar to the parts of the branched hose constructions previously set forth are indicated by like reference numerals followed by the reference letter "G".

As illustrated in FIGS. 18-21, it can be seen that the branched hose construction 30G is substantially the same as the branched hose construction 30E previously described except that the T-connector 31G thereof has a plurality of locating projections 60 extending from each annular shoulder 39G thereof, the projections 60 being spaced apart and being four in number for each leg 36G-38G in the embodiment illustrated in the drawings although any desired number thereof can be utilized.

Such projections 60 permit the hoses 32G-34G when initially telescoped onto the respective legs 36G-38G to have the end surfaces 40G thereof merely abut against the free end surfaces 61 of the projections 60 in the manner illustrated in FIG. 20 so that the end surfaces 40G thereof are initially spaced from the respective annular shoulders 39G by an amount represented by the reference numeral 62 in FIG. 20.

Thereafter, when the annular clamping means 48G are being disposed in place and are drawn inwardly so as to clamp the telescoping portions 46G of the respective hoses 32G-34G against the external peripheral surfaces 47G of the legs 36G-38G, each telescoped portion 46G is adapted to expand axially and deform around the projection 60 so that the end surfaces 40G engage against the annular shoulders 39G in the manner illustrated in FIGS. 18 and 19 whereby the spaces 62 take up or permit the inward axial expansion of the parts 46G of the hoses 32G-34G during the clamping operation of the bands 48G therewith and the projections 60 become completely embedded in the end surfaces 40G of the hoses 32G-34G.

If desired, one or more projection 60 for each shoulder 39G could be provided with a smaller projection 57G which would align with a slot means 59G in the respective hose 32G, 33G or 34G so as to provide for rotational orientation of the hoses 32G-34G onto the legs 36G-38G of the T-connector 31G in the same manner as the locating projections 57 and slot means 59 of the hose construction 30F previously described.

Therefore, it can be seen that this invention not only provides improved branched hose constructions and improved methods of making the same, but also this invention provides improved T-connectors for such branched hose constructions and improved methods of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a branched hose construction comprising a T-connector having a body portion provided with a pair of substantially oppositely directed legs extending therefrom and an outwardly directed branch leg extending therefrom intermediate said pair of legs, three tubular hoses respectively telescoped onto said legs to be disposed in fluid communication with each other through said T-connector, each said hose having an outer peripheral surface and an annular end surface, said body portion having an external peripheral surface adjacent said legs thereof, said body portion having an annular shoulder adjacent each leg thereof against which said annular end surface of its respective hose abuts and which is of a size that causes said external peripheral surface of that respective hose to substantially mate with and thereby be substantially flush with said external peripheral surface of said body portion that is adjacent that respective hose, an annular clamping means respectively disposed about said hoses and clamping the same against their respective legs of said T-connector, the improvement wherein each said annular shoulder of said T-connector has an outwardly extending projection means thereon and each said hose has said annular end surface thereof deformed around said projection means of its respective annular shoulder by its respective clamping means so as to substantially embed said projection means therein.

2. A hose construction as set forth in claim 1 wherein each said clamping means has a part thereof that extends onto said body portion of said T-connector and thus over said annular shoulder of its respective leg.

3. A hose construction as set forth in claim 2 wherein said body portion of said T-connector has annular recesses therein respectively adjacent said annular shoulders thereof and respectively receiving said parts of said clamping means therein.

4. A hose construction as set forth in claim 1 wherein each said leg of said T-connector has an annular groove means therein that receives a portion of its respective hose that is compressed therein by its respective clamping means.

5. A hose construction as set forth in claim 1 wherein each said annular shoulder is disposed substantially at a right angle relative to its respective leg.

6. A hose construction as set forth in claim 1 wherein each said hose has a slot means therein that interrupts said annular end surface thereof and receives a part of said projection means of its respective annular shoulder therein whereby said parts of said projection means and said slot means orient said hoses on said respective legs of said T-connector.

7. A hose construction as set forth in claim 1 wherein each said projection means also extends outwardly from its respective leg of said T-connector.

8. A hose construction as set forth in claim 1 wherein each said annular shoulder of said T-connector has a plurality of said projection means extending outwardly therefrom inboard of said outer peripheral edge thereof and in spaced apart relation.

* * * * *